Jan. 11, 1938. F. G. CLARK 2,105,212
CHURN
Filed Jan. 23, 1936 2 Sheets-Sheet 1

Inventor
Frank G. Clark
By
Attorney

Jan. 11, 1938.   F. G. CLARK   2,105,212
CHURN
Filed Jan. 23, 1936   2 Sheets-Sheet 2

Inventor
Frank G. Clark
By Howard Fricke
Attorney

Patented Jan. 11, 1938

2,105,212

UNITED STATES PATENT OFFICE 2,105,212

CHURN

Frank G. Clark, Minneapolis, Minn., assignor to Crane Co. of Minnesota, St. Paul, Minn., a corporation of Minnesota Application January 23, 1936, Serial No. 60,475

12 Claims. (Cl. 259—81)

This invention relates to butter churns or the like, wherein it is desirable to provide a means of supporting the body of the churn so that it may be rotated being supported at its ends. A feature of this churn is that it has no stuffing boxes or moving parts inside of the drum where bacteria may lodge and contaminate the butter, thereby providing a churn which is completely sanitary.

The end supporting means which I have provided for my churn permits expansion and contraction to take place without causing any undue strain upon the supporting means at the ends. My end supporting means for a butter churn is particularly advantageous because there are no packing glands or grease leaks and the mountings are entirely on the outside of the churn where they are readily accessible.

It is also a feature of my churn to provide a drum construction of selected wood for the staves and drum heads. The drum is bound by two heavy steel bands fastened with steel lugs which are adjustable to conform to either swelling or shrinkage of the drum. Heavy metal spiders support the drum at the ends directly inside the steel bands having bearing shoes on the outer ends of the legs of the spider which are cushioned by the ends of the staves which form the drum and which are interposed between the bearing shoes and the steel bands. The bearing shoes are adjustably supported in relation to the steel binding bands of the churn, compensating for the swelling or shrinking of the drum without undue strain on the spider. The bearing shoes are connected by suitable bolts to the steel bands with an adjustable connection so as to compensate for expansion and contraction of the drum.

A further feature of my churn resides in placing the supporting spiders within the space formed by the insetting of the drum heads from the ends of the staves of the drum, so that the spiders form a reinforcing means for the drum heads at the ends of the drum and are positioned within the space formed by the insetting of the drum heads to provide a compact, reinforced end supporting means and construction for my churn. The supporting shafts for the churn are mounted upon the hub of the spider and project from the same so as to form substantial supporting shafts at each end of the drum, which are cushionally mounted through the engagement of the bearing shoes on the ends of the legs of the spider which engage the wooden staves in a manner to be adjustably supported with the adjustable steel clamping band extending around the outside of the drum of the churn.

In the drawings forming part of the specification:

Figure 1:
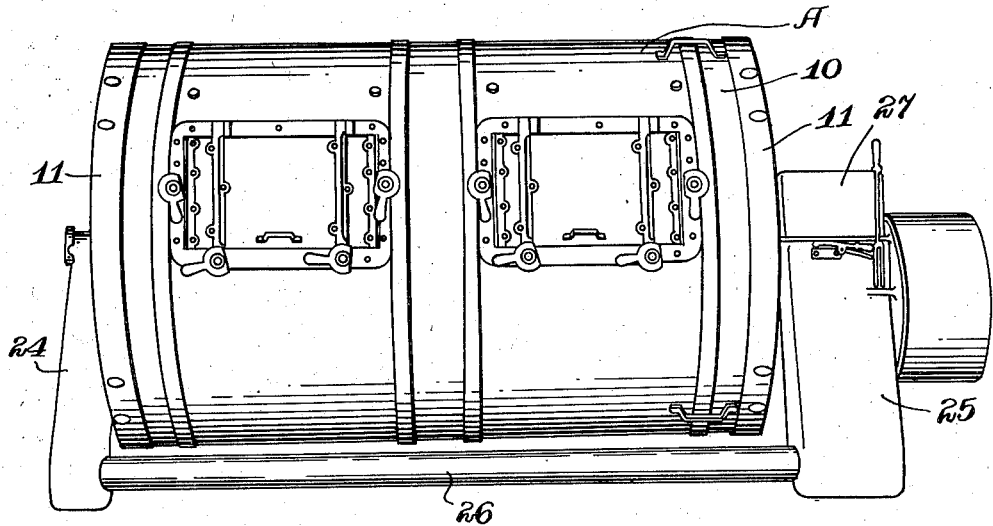
Figure 1 illustrates a perspective side elevation of my churn, showing the same supported rotatable by the end supporting brackets with a transmission driving means at one end.
Figure 2:
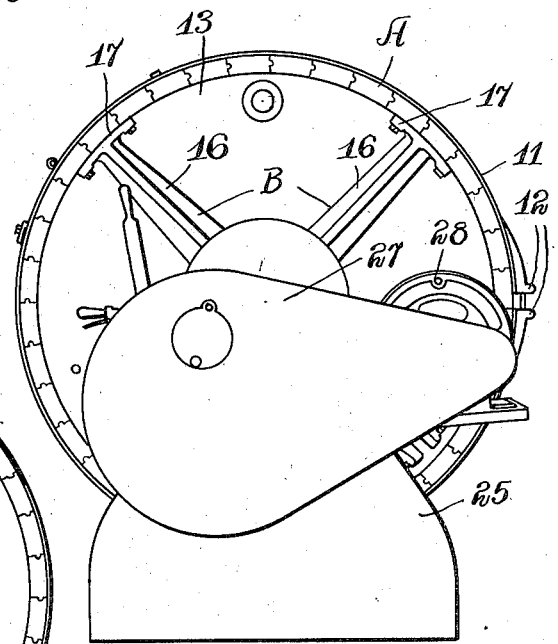
Figure 2 is an end view of my churn, looking toward the transmission and driving motor, showing the compact construction of the end mounting and driving means.
Figure 3:
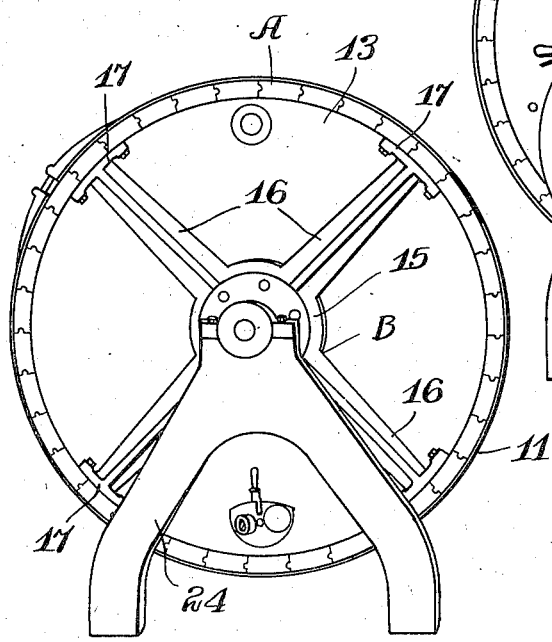
Figure 3 is an end view opposite to that shown in Figure 2 of the churn.
Figure 4:
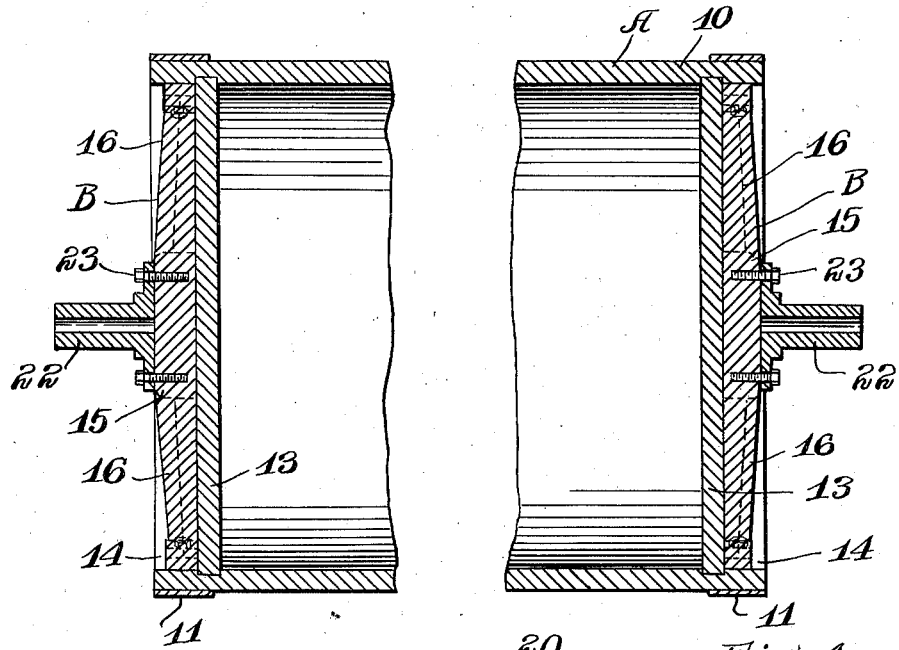
Figure 4 is a longitudinal cross-section through the drum of the churn, a portion of which is broken away.
Figure 5:
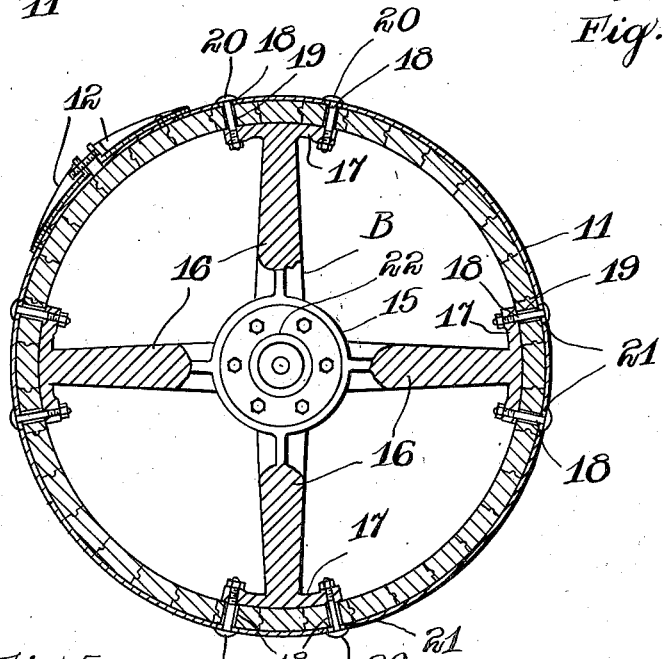
Figure 5 is an end view partially in section, showing the adjustable mounting of the spider to the churn.

The churn A is formed with a cylindrical rotatable drum 10 made up of a series of staves of selected wood, such as "Washington fir", or other similar wood, to provide staves of a strong character which are formed of an arcuated nature and grooved together, being held together by heavy steel bands 11 which are fastened with steel lugs 12 which are adjustable to compensate for swelling or shrinkage of the drum. Drum heads 13 form the end walls of the drum of the churn A. The drum heads are inset as illustrated in Figure 4, from the ends of the staves of the drum 10 to provide the space 14 in each end of the drum 10 outside of the drum heads.

Within the space 14 I position the reinforcing and supporting spider B which is formed with a hub portion 15 and a series of radially extending legs 16. The legs 16 are formed with arcuated bearing shoes 17 at the ends thereof which are adapted to engage the arcuated inner surface of the ends of the staves which form the drum 10 to cushionally support the spiders B within the recesses 14. The bearing shoes 17 are adjustably connected to the steel bands 11 by the bolts 18 which extend through the holes 19 formed in the staves of the drum 10. The holes 19 are slightly larger than the shank of the bolts 18 to compensate for the expansion and contraction of the drum 10 without causing any undue strain against the legs 16 of the spider B. The bolts 18 are provided with round heads 20 to completely close the openings 21 formed in the bands 11 for receiving the bolts 18. The openings 21 are also slightly larger than the shanks of the bolts 18 to further compensate for movement in the expansion or contraction of the drum 10 and of the adjustable binding band 11.

The hub 15 of the spider B is adapted to support the stub shafts 22 which are connected to the hub by the bolts 23 to securely fasten the shafts 22 to the spiders B. The shafts 22 are supported by the end brackets 24 and 25, respectively, which are formed with suitable leg portions adapted to extend to the floor and which hold the shafts 22 in a manner to permit the churn A to be freely rotated.

The brackets 24 and 25 are connected by the longitudinally extending brace members 26 which extend along near the floor. The bracket 25 provides the supporting means for the transmission 27 and by means of a suitable electric motor 28 operating through the transmission, the churn A may be rotated at the desired speed, variations in speed being provided by the transmission and clutch means 27 which may be operated as desired to rotate the churn A.

The supporting spiders B extend across the drum heads 13 bearing flat against the same. The legs 16 of the spider B have an outer reinforcing rib extending along the same so as to provide a strong outer reinforcing means for the drum heads. The adjustable steel bands 11 are positioned directly outside the periphery of the drum heads and the bearing shoes 17 of the spider B. Thus the drum heads 13 and the spiders B are clamped securely within the recesses 14 of the end of the churn A.

It is a primary feature of my churn to provide a means of supporting the drum 10 of the same so that it may be readily rotated upon shafts and bearings which are entirely outside of the inner chamber of the churn and without the necessity of any shaft or openings passing through the churn which would require packing. I provide such a means of a simple character wherein a primary feature resides in securing a reinforcing spider which extends across the outside of the drum heads 13 and which is cushionally supported to the drum of the churn through the staves of the drum, as well as being adjustably connected to the binding bands 11 so that the churn may expand and contract without undue strain upon the supporting and reinforcing spider B. Further, any shock or force of the driving mechanism for the churn A is carried through the cushion supporting means so as to relieve the strain on the churn as well as on the supporting spider. This provides a churn construction of a very desirable nature in that it permits the inside of the churn to be kept completely sanitary at all times. Further, this construction of a churn is more durable and is not subject to splitting or cracking, but may be kept bound tightly together being cushionally supported and operated.

I claim:

1. A butter churn comprising a cylinder, end walls for said cylinder, a supporting spider frame adjacent said end walls, radially extending legs on said frame, an arcuated shoe on said legs adapted to form a support for the ends of said cylinder, a clamping band circumferentially extending about the ends of said cylinder, and bolt means adjustably connecting said shoe and band to support the ends of said cylinder.

2. A butter churn or the like, including a cylinder, a support for the ends of said cylinder having radially extending members, arcuated ends engaging against the inside of the ends of said cylinder, clamping bands about the ends of said cylinder adjustably connected to said arcuated ends.

3. A butter churn including a rotatable cylinder having inset transverse end walls, end frame supports for the ends of said churn, engaging the inner surface of said cylinder, an expandible and contractible band encircling said cylindrical wall, and means for adjustably supporting said frame supports to said band encircling the cylindrical wall of said churn to compensate for expansion and contraction of the body of said churn.

4. A churn including a cylindrical body portion, inset end walls, a supporting frame within said inset portions engaging the inner surface of the cylinder, means variable in diameter encircling said body portion and means for adjustably connecting said frame supports to said means encircling cylindrical body.

5. A churn comprising inset transverse end walls, a cylindrical body, a metal supporting frame positioned in the inset having radially extending portions, bearing foot portions on the ends of said radially extending portions engaging with and cushioned by the cylindrical wall of said churn, and clamping bands about said churn adjustably connected to said foot portions.

6. A churn including a drum formed of non-metallic staves, adjustable bands for binding said staves together, and means spaced from said bands and angularly and radially adjustable with respect thereto cushionally supported within the outer end of said staves for supporting the drum of said churn in a manner to permit the same to be rotated on said supporting means.

7. A butter churn or the like, including a cylindrical drum, and means for adjustably and cushionally supporting said drum to permit the same to be rotated and to provide a cushional means between the driving mechanism and the body of said churn to absorb expansion and contraction thereof and the driving force operating said churn, said means including a support engaging the inner surface of the drum, spaced means engaging the outer surface of the drum, and means connecting the said support and spaced means relatively angularly and radially adjustable.

8. A churn including a cylindrical horizontally disposed body portion, inset end walls formed in said body portion adapted to provide projecting annular wall portions extending beyond said end walls, a spider-like supporting member having means for axially supporting said churn on a rotatable shaft means, radially extending arms formed in said spider member, an arcuated shoe formed on the end of each of said arms adapted to engage the inner surface of said overhanging wall portions of the body of said churn, adjustable securing bands extending about said overhanging wall portions on the outside thereof adapted to clamp the wall portions together and against said arcuated shoe end of said spider, and bolt means adjustably engaging said bands and arcuated shoe end of said spider, whereby the ends of said spider are cushionally and adjustably supported to the end of the wall of said cylindrical body.

9. A butter churn including a cylindrical body portion having annular overhanging end wall portions formed by the insetting of the end walls of said body to provide an annular wooden rim which is an extension and integral portion of the annular wall of the churn body, and means for supporting said churn at the ends including a metal spider-like bracket adapted to be secured at each end and having shoe portions engaging the wall of the churn and secured thereto by bolts passing through said wall, and an annular clamping band adjustably connected by said bolts to said shoes to provide a cushion expandible means for supporting the body of said churn on the outside thereof to permit said churn to be rotatably supported by the metallic spider frame at each end thereof.

10. A churn comprising a cylindrical horizontally disposed rotatable body formed of wood, overhanging ends formed by the cylindrical wall of said body, inset end walls, an adjustable clamping band about said end of said body, a metallic frame positioned in said inset portion of the ends of said churn and adapted to be secured thereto by peripheral engagement of said frame to the wall of said cylindrical body which provides a cushion for said frame, and means adjustably connecting the peripheral portion of said frame to said clamping band, extending through the overhanging ends of the wall of said cylindrical body whereby expansion and contraction may take place in said body of said churn without extending an undue strain upon said supporting frame, and axial supporting means extending from said frame to mount said churn rotatable on said frame.

11. A butter churn or the like, including a cylindrical body, inset end walls forming an overhanging annular rim at each end of said body, a clamping band around the overhanging end of said body, means for adjusting said bands, and a metallic supporting frame positioned within said inset portion formed in said body having an axial bearing supporting means and a peripheral engagement through the cylindrical rim of the wall to adjustably support said frame at each end cushioned by the wooden rim of the body and adjustably connected to said outer clamping band.

12. A butter churn or the like, including a cylindrical wooden body portion having overhanging end rim portions integrally extending from the wooden body of said churn, and means for cushionally supporting a metallic spider-like supporting frame in said inset ends by peripheral engagement with said rims and adjustable bolt means extending through the clamping bands extending around the outside of the body of said churn.

FRANK G. CLARK.